United States Patent [19]

Hampton et al.

[11] Patent Number: 5,160,442
[45] Date of Patent: Nov. 3, 1992

[54] METHOD OF CLEANING A DISPOSABLE CARTRIDGE FILTER

[75] Inventors: John R. Hampton; Thomas L. Asher, both of Houston, Tex.

[73] Assignee: Filtration Technology Corporation, Houston, Tex.

[21] Appl. No.: 510,965

[22] Filed: Apr. 19, 1990

[51] Int. Cl.[5] .............................................. B01D 29/62
[52] U.S. Cl. ................................... 210/791; 210/797; 134/22.12
[58] Field of Search ...................... 210/252, 253, 257.1, 210/258, 323.2, 333.01, 410, 791, 797; 134/22.12

[56] References Cited

U.S. PATENT DOCUMENTS

| | | | |
|---|---|---|---|
| 2,848,112 | 8/1958 | Hass | 210/410 |
| 2,862,622 | 12/1958 | Kircher et al. | 210/410 |
| 4,528,103 | 7/1985 | Spilkin et al. | 210/333.01 |
| 4,552,669 | 11/1985 | Sekellick | 210/410 |
| 4,592,847 | 6/1986 | Schumacher | 210/333.01 |

Primary Examiner—Robert A. Dawson
Assistant Examiner—Wanda L. Millard
Attorney, Agent, or Firm—Jackson & Walker

[57] ABSTRACT

Method and apparatus are provided for treating and removing particulate matter from fluid circulatable into, through and out of an industrial operation, and for cleaning a disposable cartridge filter used therein. In treatment of fluid, the fluid is circulated in a flow path and is introduced into a filter vessel having a disposable cartridge filter. The fluid flows through the cartridge filter at a rate of flow insufficient to produce a buildup of a substantially non-porous solids filter cake around the exterior of the cartridge filter. The clean fluid is circulated to the industrial operation. The cleaning method and apparatus includes a storage vessel in selective fluid communication with the interior of the first vessel such that clean fluid may be flowed from the storage vessel into the interior of the cartridge filter then through and thereafter exterior of the cartridge filter to effectively remove the particulate matter deposited on or around the exterior of the cartridge filter.

2 Claims, 5 Drawing Sheets

METHOD OF CLEANING A DISPOSABLE CARTRIDGE FILTER

BACKGROUND OF THE INVENTION

1. Field of the Invention

The invention relates to a method and apparatus for cleaning fluid used in an industrial operation, such as a water purification plant, a completion or workover operation of a subterranean well, or the like, wherein a disposable cartridge filter is used to clean the fluid without production of a substantially non-porous solids filter cake around the exterior of the cartridge filter, and to a method of cleaning the cartridge filter utilizing the cleaned fluid in the cleaning procedure.

2. Brief Description of the Prior Art

Disposable cartridge filters are well known to those skilled in the art of cleaning fluids used in industrial operations, such as in municipal waste and water purification operations, refinery and chemical manufacturing operations, food processing procedures, and in the completion and/or workover operations of subterranean oil and/or gas wells. Such disposable cartridge filters generally are formed of a paper-like substance and are designed to be received within a vessel housing same and are removed, disposed of, and replaced with new filters as needed.

In industrial operations wherein a fluid, such as water or the like, is to be cleaned of particulate contaminate matter, such as fine sand, silt, and other similar solids, which is deemed to be a contaminate for one reason or another, a plurality of the cartridge filters will be placed within the vessel and the fluid flow containing the contaminate matter is introduced into the vessel for filtering of the particulate matter around the exterior of the filter, such that the clean fluid passes interiorly through the cartridge filter thence outwardly of the vessel.

When fluids associated with such industrial operations are cleaned incorporating such cartridge filters, a filter cake formed of said particulate matter can be expected to accumulate around the exterior surface of the cartridge filter, and in some events, into the filter media itself, reducing the effectiveness of the cleaning operation and the rate of flow of fluid therethrough and otherwise adversely affecting the filtering operation. As a result of the formation of such filter cake, such cartridge filters must be cleaned or replaced from time to time. Such cleaning or replacement is often time consuming and otherwise costly, resulting in considerable downtime for the flow of fluid during the industrial operation.

In the past, those skilled in the art have attempted to extend the useful life of such disposable cartridge filters by, for example, controlling the pressure of the flow through the filtering system to eliminate or greatly reduce any differential pressure across the cartridge filter exterior face to avoid a buildup of such a non-porous filter cake. Typical of such procedures is that disclosed in U.S. Pat. No. 1,780,723, entitled "Control for Oil Filters", and U.S. Pat. No. 3,926,806, entitled "No-Bypass Filter System".

The present invention provides a method and apparatus for removing particulate matter from fluids circulatable into, through and out of an industrial operation, as well as to a method and apparatus for cleaning of disposable cartridge filters by maintaining a specific minimum flow rate range per filter surface area per minute, as opposed to reducing or eliminating differential pressure across said cartridge filter to provide a substantially non-porous solids filter cake around the exterior of the cartridge filter.

The commonly accepted optimal flow rate through a disposable cartridge filter has thought to be about one-half gallon per square foot per minute, or 1.8925 liters per 144 square inches, or 1,892.5 ml per 144 square inches, which is equal to 13.14 ml per square inch surface area of filter per minute. In contrast, in the present invention, the flow rate across the disposable cartridge filter is maintained at an optimal flow rate. While such flow rate is, of course, dependent upon the construction and other parameters of the selected disposable cartridge filter, the vessel incorporating such filter, and the chemical composition of the fluid to be cleaned therethrough, as well as the volume, particle size and composition of the contaminate particulate matter, typically, such critical flow rate range will be from between about 0.19 ml per square inch of cartridge filter surface per minute to about 1.73 ml per square inch of disposable cartridge filter surface per minute. Preferably, it has been found that such optimal flow rate will be about 0.575 ml per square inch of cartridge filter surface per minute.

By controlling the flow rate through the filter means, particles forming the particulate matter are not effectively carried with the fluid stream and tend to settle out and not be deposited around the exterior of the cartridge filter to thereby be available for the formation of any adverse cake thereacross. Accordingly, any filter cake that develops on the filter media of the disposable cartridge filter is not compressed and does not develop any significant thickness because the force of gravity acting on such cake will be greater than the fluid flow force holding the cake in place. Accordingly, any filter cake that develops will be porous and will retain its permeability and allow the fluid flow rate to be maintained by increasing pump pressure in incremental stages.

In the past, those skilled in the art of incorporating disposable cartridge filters into cleaning operations for industrial applications have encountered considerable problems in cleaning of such cartridge filters upon the occurrence of a buildup of an adverse cake. When such cartridge filters are cleaned by reversing flow of fluid through such filters, the resultant produced dirty fluid must be disposed of in some environmentally acceptable manner. The present invention addresses such problem by providing a system for cleaning of such cartridge filters, in place, incorporating the cleaned fluid produced through normal filtering operation and providing a back flush procedure which does not produce a resultant fluid flow which might be difficult to dispose of because of environmental safeguards.

SUMMARY OF THE INVENTION

The present invention provides a method and apparatus of cleaning a disposable cartridge filter while in a vessel incorporated into a filtering system used to remove contaminate particulate matter from fluids circulatable into, through and out of an industrial operation. The method includes the steps of providing a filtering system comprising a first vessel housing at least one disposable cartridge filter and a storage vessel in selective fluid communication with the interior of the first vessel for receipt of filtered clean fluid. A purge vessel may also be provided in one form of the invention and is in selective fluid communication with the clean fluid storage vessel and the first vessel for receipt of fluid and particulate matter during the cleaning. The clean fluid is flowed from the storage vessel into the interior of the cartridge filter thence through and out of the exterior of the cartridge filter to effectively remove any particulate matter deposited on and around the exterior of the cartridge filter.

In one form of the invention, the cartridge filter is first hydraulically cleaned by such a procedure and thereafter is followed by pneumatic cleaning, which may be in the form of a throttling or vibratory action, to completely remove any particulate matter in cake or noncake form from around the exterior of the cartridge filter.

The present invention also provides a method for removing contaminate particulate matter from fluid circulatable into, through and out of an industrial operation by forming a fluid flow path into, through and out of the industrial operation and thereafter circulating fluid in the flow path. The circulated fluid is introduced into a filtering vessel to remove the contaminate particulate matter from the fluid to thereby provide a clean fluid with the vessel comprising at least one disposable cartridge filter. The circulated fluid is flowed through the cartridge filter at a rate of flow insufficient to produce a buildup of a substantially non-porous solids filter cake around the exterior of the cartridge filter.

The rate of flow should be no more than about 1.73 ml per square inch of cartridge filter surface per minute. Generally speaking, the rate of flow should be from between about 0.19 ml per square inch of cartridge filter surface per minute and about 1.73 ml per cartridge surface inch per minute.

DESCRIPTION OF THE PREFERRED EMBODIMENTS

Figure 1:
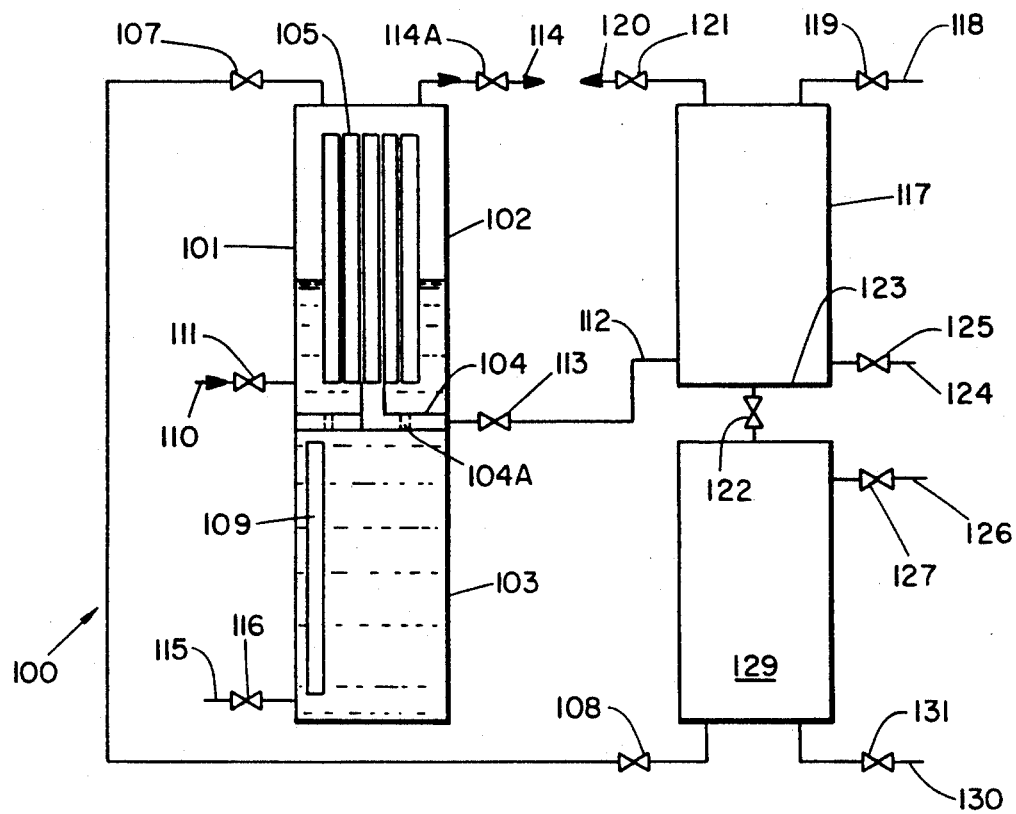
FIG. 1 is a diagramatic illustration of the method and apparatus of the present invention wherein a first or filtering vessel is being filled with a dirty fluid.

Now with reference to FIG. 1, there is shown a filtering system 100 which generally comprises a first vessel 101 and a separate storage vessel 117 above a purge tank 129 in selective communication therewith. Of course, the storage vessel 117 and purge tank 129 may be provided as separate components, it being necessary only that the tank 129 and vessel 117 be in selective fluid communication between one another, and that the vessel 117 be in selective communication with the first vessel 101.

The first vessel 101 defines first and second fluid chambers, 102, 103 which are always in fluid communication, with a baffle 104 having ports 104a positioned approximately medial of said chambers, 102, 103. The ports 104a defined through the baffle 104 provide continuous fluid communication between the chambers, 102, 103, with the solid surface of the baffle 104 receiving a clean fluid line 112 extending through the first vessel 101 and communicating to the interior of one or more disposable cartridge filters 105 housed within the first chamber 102 on the baffle 104.

A dirty fluid inlet 110 communicates with the industrial operation and contains valve 111 of known construction which is selectively movable between open and closed positions with the line 110 being extended through the outer housing of the first vessel 101.

At the top of the first vessel 101 is a purge line 106 communicating between the first chamber 102 and the purge tank 129 with valve 107 placed thereon for controlling fluid flow selectively through the line 106.

An air vent 114 is also provided at the top of the first chamber 102 of the first vessel 101 with a similarly controlled valve 114A thereon to control venting of air, as described below.

The second chamber 103 of the first vessel 101 preferably houses an auxiliary filter means 109, which as shown, is also a disposable cartridge filter of the same construction of the disposable cartridge filters 105 positioned on the baffle 104 and housed within the first chamber 102.

At the lowermost end of the second chamber 103 is a drain line 115 and drain line valve 116 to permit draining of the fluid within the second chamber 103, as described below.

The lowermost end of the disposable cartridge filters 105 is in communication with the fluid flow line 112 having valve 113 thereon with the line 112 extending through the outer housing of the storage vessel 117 to a seal or diaphragm chamber 123 separating the storage vessel 117 from the purge tank 129. A valve 122 is placed on the exterior of the vessel 117 immediate the purge vessel 129 and is manipulatable to permit or prevent fluid communication between the vessels, 117, 129.

The storage vessel 117 will receive clean fluid which is filtered through the disposable cartridge filter 105 and communicated through the clean fluid line 112 thereto. An air vent line 120 is positioned through the top of the storage vessel 117 with valve 121 thereon manipulatable between closed and open positions to control the venting of air therethrough. Similarly, an air supply line 118 is also defined through the top of the storage vessel 117 with valve 119 controlling air communication therethrough.

A clean fluid outlet 124 is extended through the lowermost end of the storage vessel 117, but above the seal 123, with clean fluid valve 125 disposed thereon to control the flow of clean fluid therethrough. The clean fluid outlet line 124 extends to the input to the selected industrial operation.

The purge vessel 129 receives below the seal 123 an air vent line 126 with air vent line value 127 thereon to control the venting of air therethrough.

At the lowermost end of the purge tank 129 is received the end of the purge line 106 extending from the top of the first chamber 102, with fluid flow therethrough controlled by means of valve 108 thereon. A second air supply line 130 is also communicating with the lowermost end of the purge tank 129 with valve 131 extending thereon.

As shown in FIG. 1, fluid to be cleaned which contains contaminate particulate matter passes through dirty fluid inlet 110 through open valve 111 thence into the first chamber 102 where it passes through the disposable cartridge filters 105 from the exterior to the interior thereof, thence through the clean fluid line 112.

Figure 2:
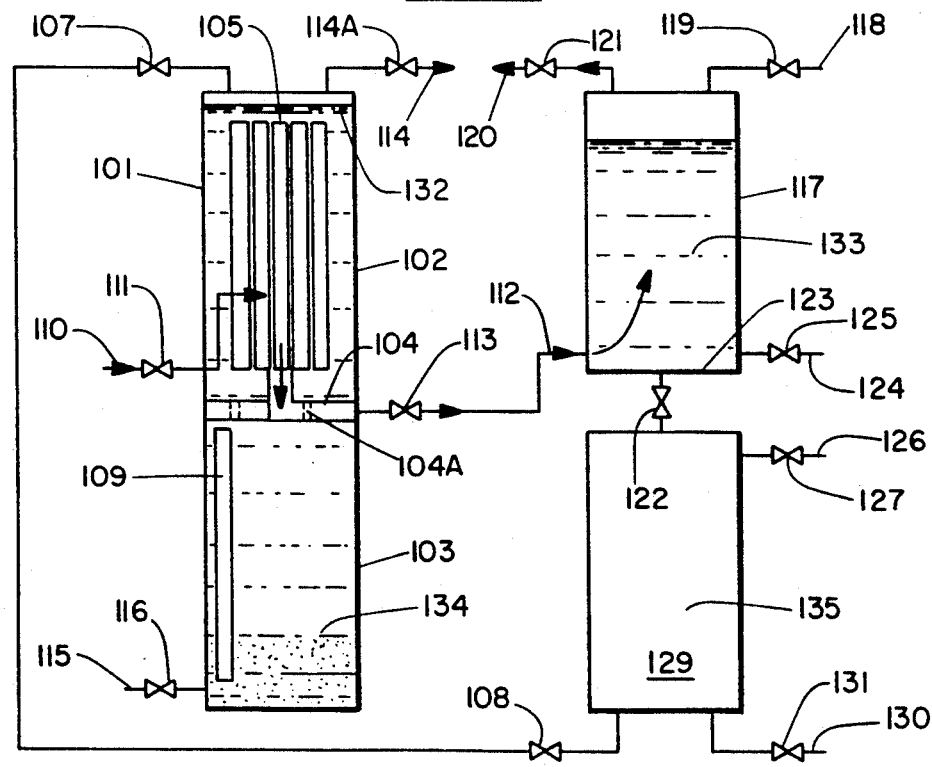
FIG. 2 is similar to that of FIG. 1 in which dirty fluid is being filtered and passed to the storage vessel.
Figure 3:
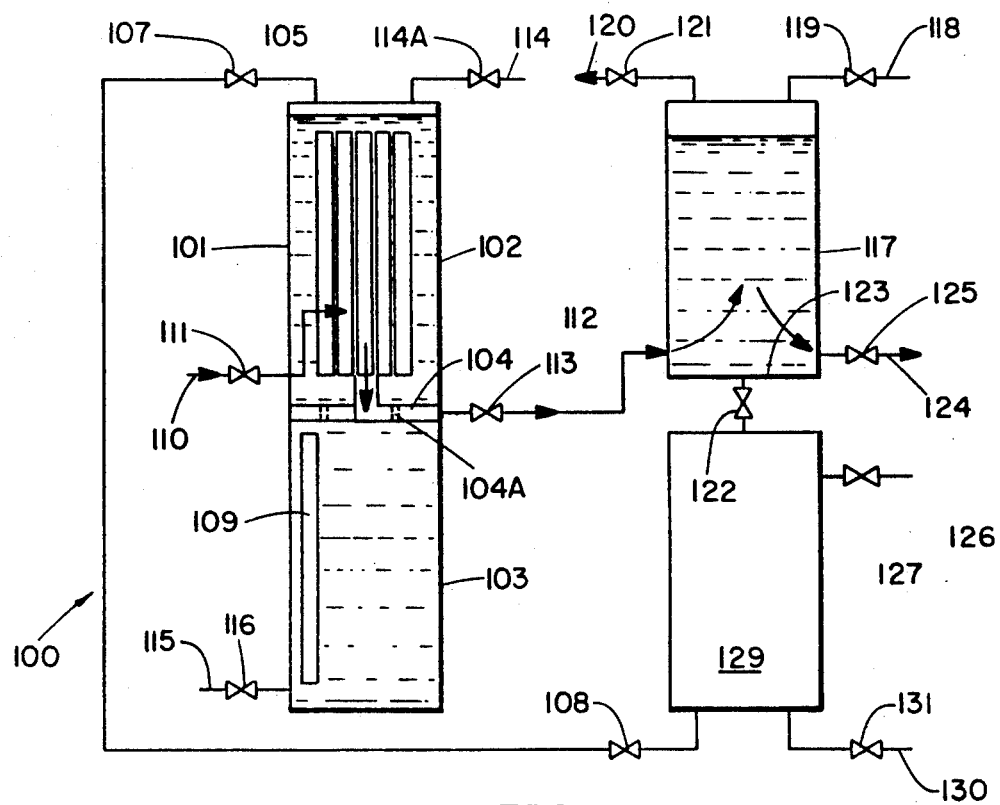
FIG. 3 is a view similar to that of the previous views showing normal flow operation during fluid circulation for the industrial operation.
Figure 4:
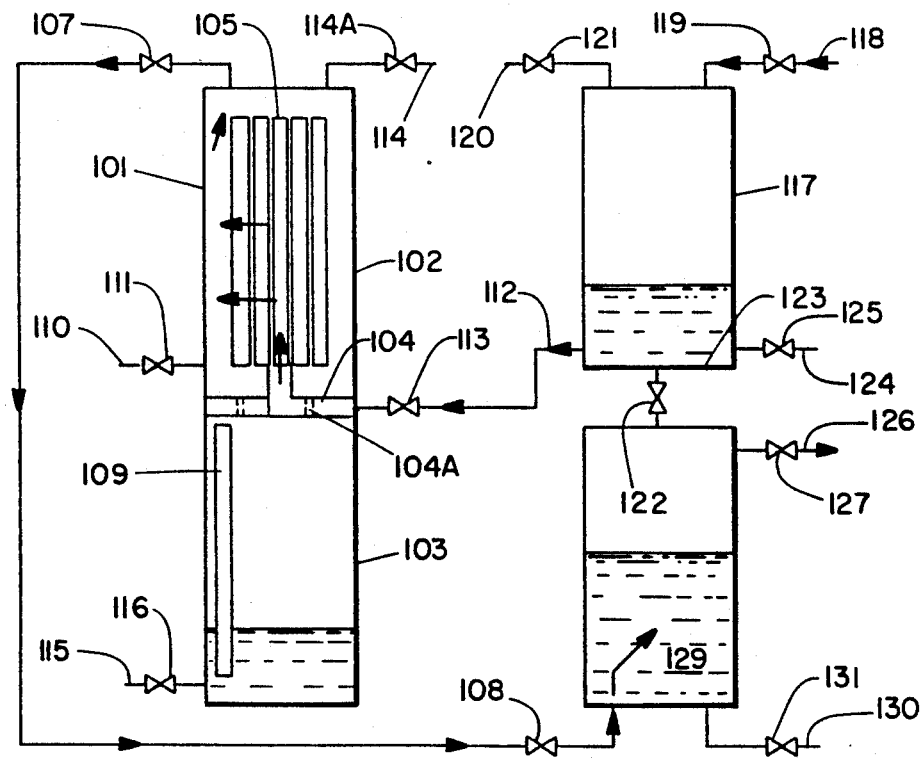
FIG. 4 is a view similar to that of the previous views showing back washing of the filtering apparatus.

In order for there to be effective utilization of all of the surface area of the disposable cartridge filters 105, the fluid level of the dirty fluid within the first chamber 102 should be above the uppermost end of the disposable cartridge filters 105, at the level 132 (FIG. 2).

In order to avoid the formation of a substantially non-porous solids filter cake around the exterior of the cartridge filters 105, the flow rate of the dirty fluid through the inlet 110 should be controlled such that it is from between about 0.19 ml per square inch of cartridge filter area per minute to about 1.73 ml per cartridge square inch of filtering area per minute, and preferably will be maintained at about 0.575 ml per square inch of cartridge filter area per minute and this can be readily calculated by those skilled in the art knowing the volume of the first chamber, the surface area of the cartridge filters 105, the content of the contaminate particulate matter, the composition of the fluid to be cleaned, and by appropriately throttling the valve 111.

As an example of determination of optimal flow rates for the present invention, if the selected fluid is tap or other water weighing 8.33 lbs. per gallon, and the solids concentration in such water is 10,000 parts per million, the optimal flow rate will be 0.575 ml per square inch of filter surface area per minute. If the selected fluid is salt water weighing 16 lbs. per gallon, and the solids concentration is 10,000 parts per million, the optimal flow rate will be 0.250 ml per square inch of filter surface area per minute. If the selective fluid is tap or other water weighing 8.33 lbs. per gallon, and the solids concentrations is 1,000 parts per million, the optimal flow rate will be 1.250 ml per square inch of filter surface per minute.

Throttling of the valve 111 to effect optimal flow rate can be made by incorporation of a conventional flow meter which may be affixed to the inlet line 110 or the clean fluid line 112 and the valve 111 or 113 throttled in accordance with the readings of the flow meter.

As shown in FIG. 1, the controlled fluid line valve 113 is in closed position to permit the filling of the first chamber 102 to the level 132, with the air vent valve 114a being open to vent air and the purge valve 107 being closed. The drain line valve 116 is also, of course, closed. During the filling of the first chamber 102 through the dirty fluid line 110, all other valves in the filtering system 100 will be closed.

Now, with reference to FIG. 2, subsequent to providing the fluid level in the first chamber 102 to the level 132, the valve 113 of the clean fluid line 112 is opened and the air vent valve 121 of the storage vessel 117 is open to permit clean fluid to be transmitted through the clean fluid line 112 into the clean fluid storage vessel 117.

Subsequent to the filling of the clean fluid storage vessel with clean fluid 133, the clean fluid outlet valve 125 is open to permit gravity draining, or pumping, if necessary, of clean fluid 133 from the interior of the storage vessel 117 through the clean fluid outlet line 124 to the particular industrial application at hand.

When it is desired to clean the disposable cartridge filters 105, the clean fluid 133 within the storage vessel 117 may be utilized to clean the cartridge filters 105 in the first chamber 102. The clean fluid outlet valve 125 is closed, and the air supply valve 119 is opened. The air vent line valve 121 at the uppermost end of the storage vessel 117 is closed and the purge valve 107 at the uppermost end of the first vessel 101 is opened, together with valve 108 at the lowermost end of the purge tank 129. Now, air within the air supply line 118 will be pumped through the storage vessel 117 to move the clean fluid 133 therein through the clean fluid line 112 through the interior of the disposable cartridge filters 105 to their exterior to remove any filter cake or contaminate particulate matter from around the exterior of the disposable cartridge filters 105, with excess fluid and some of the contaminate particulate matter therein passing through the purge line 106 to within the purge tank 129. Venting of the purge tank 129 is effected by opening of the air vent 127 to the air vent line 126 in communication therewith.

Figure 5:
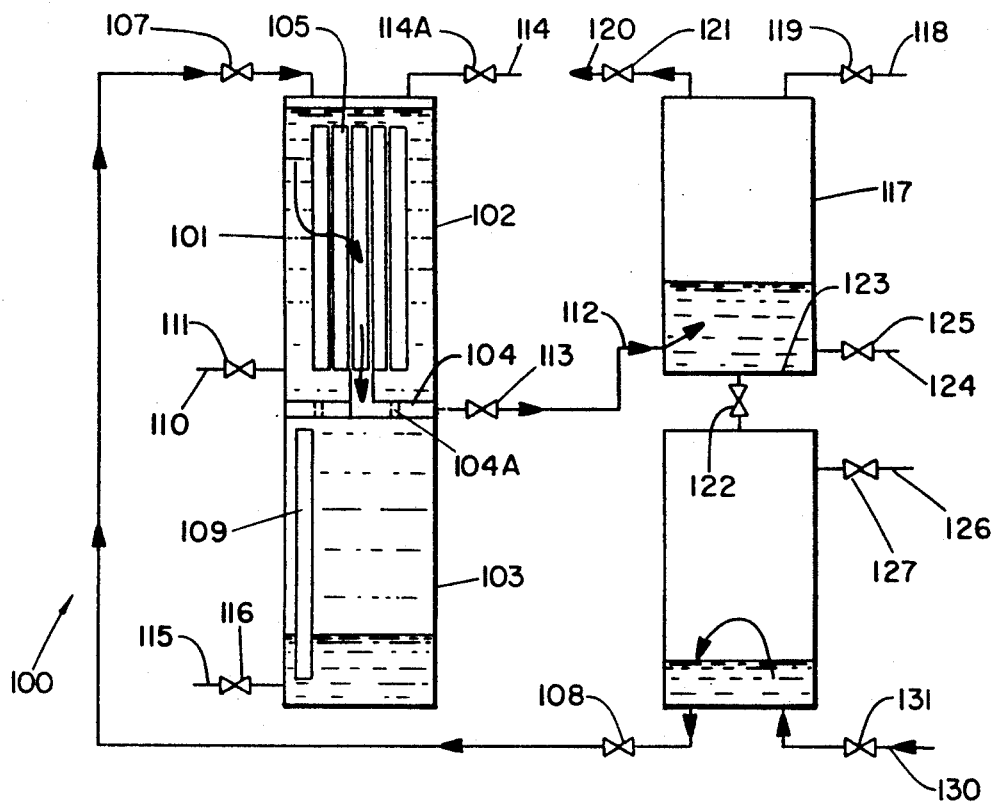
FIG. 5 is a view similar to the previous views showing the cleaning operation for the cartridge filter apparatus to filter fluid from the purge tank for cleaning and depositing within the storage vessel.

Now with reference to FIG. 5, any fluid within the purge tank 129 as a result of the cleaning action of the disposable cartridge filters 105, as described above, may also be cleaned by opening the air supply valve 131 to the air supply line 130 at the lowermost end of the purge tank 129, opening the air vent line valve 121 at the uppermost end of the storage vessel 117, closing the air supply line valve 119 at the uppermost end of the storage vessel 117, and recycling such fluid within the tank 129 through the purge line 126 to the interior of the first chamber 102 then through the disposable cartridge filters 105, and the clean fluid line 112 to the clean fluid storage vessel 117. Solids 134 within the second chamber 103 will be contained within the second chamber 103 around the exterior of the auxiliary filtering means 109.

Figure 6:
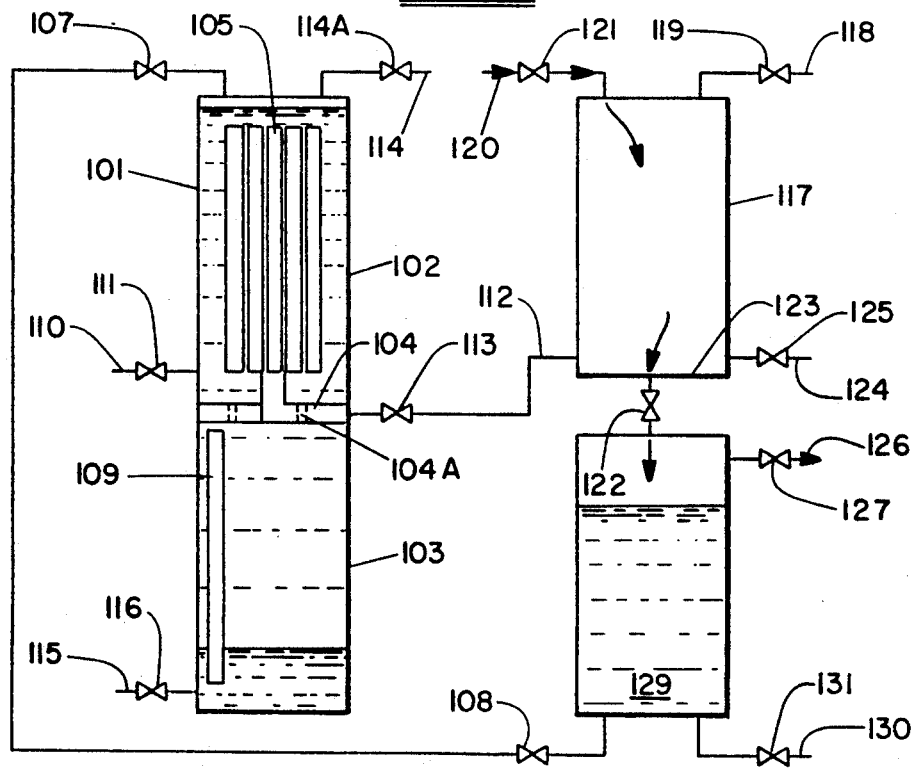
FIG. 6 is a view similar to the previous Figs. illustrating removal of clean fluid from the storage vessel into the purge vessel after the cleaning sequence.

Now with reference to FIG. 6, the resultant clean fluid in the storage vessel 106 will be moved to the purge tank 129 by opening of the valve 122 and the air vent 127 of the purge tank 129. Both the air supply valve line 131 and the valve 108 at the lowermost end of the purge tank 129 will have been subsequently closed. The clean fluid valve 113 will also be closed, and the dirty fluid inlet valve 111 will be closed.

Figure 7:
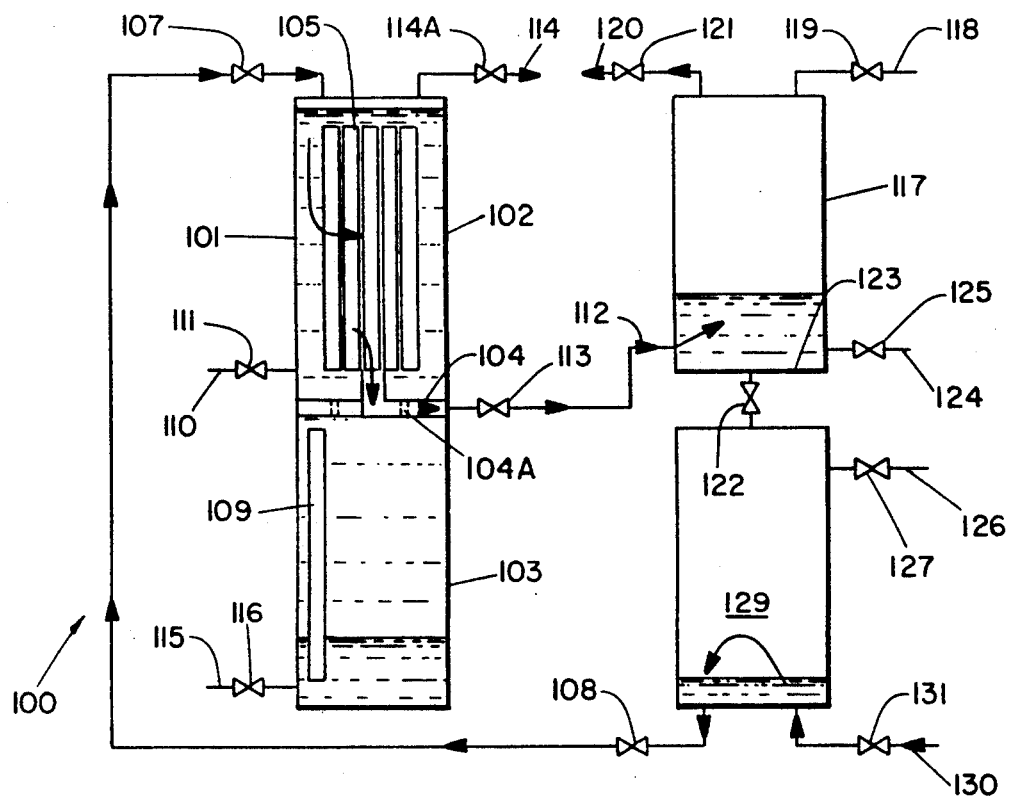
FIG. 7 is a view similar to the previous views showing refiltering of fluid within the purge vessel.

Now with reference to FIG. 7, fluid then placed within the purge tank 129 may be filtered a second time by opening the air supply valve 131, and purge valve 108, together with purge valve 107 and by closing the valve 122 on the seal 123. The flow of fluid is as indicated in the drawing.

Figure 8:
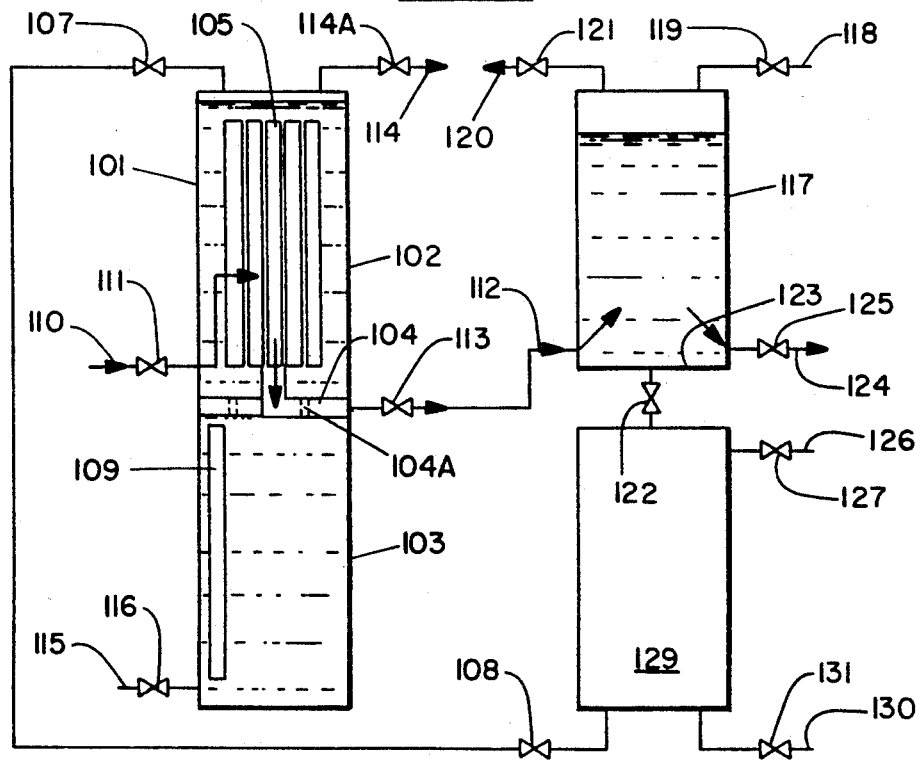
FIG. 8 is a view of the sequence of operations subsequent to the procedure set forth in FIG. 7, and is identical to the procedure set forth in FIG. 3.

Subsequent to the operation shown in FIG. 7, normal flow operation may be effected by manipulating the valves as indicated in FIG. 8.

Figure 9:
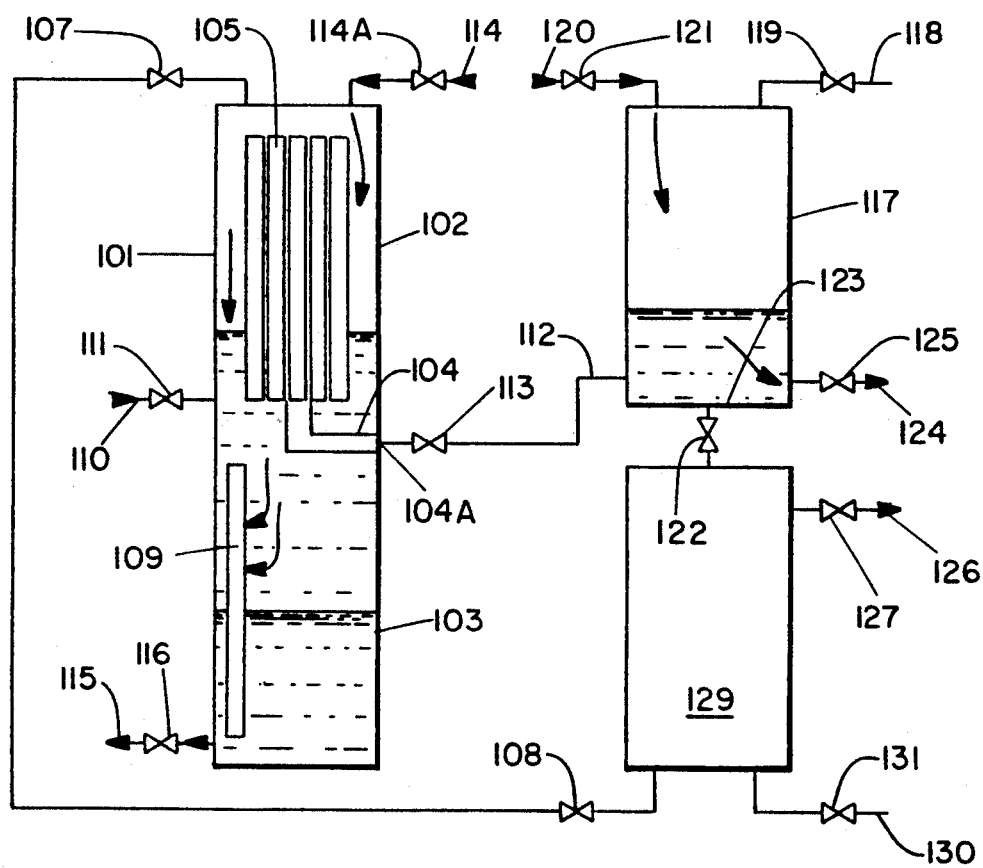
FIG. 9 is a view similar to that of the previous views showing removal of contaminate particulate matter within the second chamber of the first vessel through the auxiliary filter means to provide clean fluid therefrom.

Upon completion of the filtering operation for the industrial fluid, the solids 134 within the second chamber 103 may be separated from fluid by opening the drain line 115 by manipulating the valve 116 to open position. The auxiliary filter means 109 will separate the solids from the fluid to permit only clean fluid to pass through the drain line 115. Subsequently, the second chamber 103 may be disengaged from the first chamber 102, such as by means of unthreading threads (not shown), removal of sealing clamps, or the like, separating the first and second chambers 102, 103 and the solids 134 manually or otherwise removed from the second chamber 103. In such operation, the respective valves of the filtering system 100 are shown in the indicated positions of FIG. 9.

A feature of the present invention is that the back wash cleaning operation is performed at a comparatively low pressure level which abates exposure of the sensitive paper-like disposable cartridge filters to deterioration caused by conventional high pressure environments. In the present invention, the cleaning procedure is effected at low pressure on the order of no more than about 40 p.s.i.

While it is preferred in the present invention to hydraulically remove filter cake and follow such hydraulic removal by cleaning of the disposable cartridge filter by introducing a gas through the interior to the exterior of the cartridge filter, the cleaning procedure may also be effected by using either a liquid, such as water, or a water with an appropriate solvent or the like or by simply introducing a gas, such as air, through the interior to the exterior of the cartridge filter to remove substantially all of any filter cake from the disposable cartridge filter.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. The method of cleaning a disposable cartridge filter while in a vessel incorporated into a filtering system used to remove contaminate particulate matter from fluid circulatable into, through and out of an industrial operation, said method comprising the steps of:
   (1) providing a filtering system comprising:
      (a) a first vessel housing at least one disposable cartridge filter, said first vessel defining first and second chambers in fluid communication with one another, said first chamber housing said disposable cartridge filter and said second chamber capturing particulate matter from said fluid during circulation and/or cleaning of said fluid, said second chamber housing at least one auxiliary fluid filter means;
      (b) a storage vessel in selective fluid communication with the interior of said first vessel for receipt of filtered clean fluid produced by circulating said fluid within said system;
   (2) circulating fluid with said particulate matter captured during cleaning and/or circulation from the interior of said second chamber through said auxiliary fluid filter means to the exterior of said first vessel, whereby said particulate matter is substantially removed from said fluid to provide said clean fluid.

2. The method of claim 1 wherein said method is performed within said filtering vessel at a pressure of no more than about 40 p.s.i.

* * * * *